United States Patent [19]

Mori

[11] Patent Number: 5,031,986

[45] Date of Patent: Jul. 16, 1991

[54] LIGHT DISTRIBUTION DEVICE

[76] Inventor: Kei Mori, 3-16-3-501, Kaminoge, Setagaya-ku, Tokyo, Japan

[21] Appl. No.: 459,916

[22] Filed: Jan. 2, 1990

[30] Foreign Application Priority Data

Jul. 28, 1989 [JP] Japan .................................. 1-196061

[51] Int. Cl.$^5$ ............................................. G02B 6/26
[52] U.S. Cl. .............................. 350/96.15; 350/96.10
[58] Field of Search ........................... 350/96.10, 96.15

[56] References Cited

U.S. PATENT DOCUMENTS

| | | | |
|---|---|---|---|
| 4,302,069 | 11/1981 | Niemi | 350/96.10 X |
| 4,447,118 | 5/1984 | Mulkey | 350/96.16 |
| 4,626,065 | 12/1986 | Mori | 350/96.15 |

*Primary Examiner*—William L. Sikes
*Assistant Examiner*—Phan T. Heartney
*Attorney, Agent, or Firm*—Jordan and Hamburg

[57] ABSTRACT

A light distribution device has a first light-guide cable for transmitting light rays, a number of second light-guide cables having light-receiving ends arranged together to form a light-receiving ring plane, a driving means for rotating the light-emitting end of the first light-guiding cable around the light-receiving ring-plane, a light coupler secured at the light-emitting end of the first light-guide cable. The light coupler has a surface similar to that of a part composing the light-receiving ring-plane of the second light-guide cables and makes a circular motion along the light-receiving ring-plane at a constant relation thereto. The light-receiving ring facing to the light coupler is divided into a plurality of blocks, each of which consists of a given number of secondary light-guide cables.

11 Claims, 6 Drawing Sheets

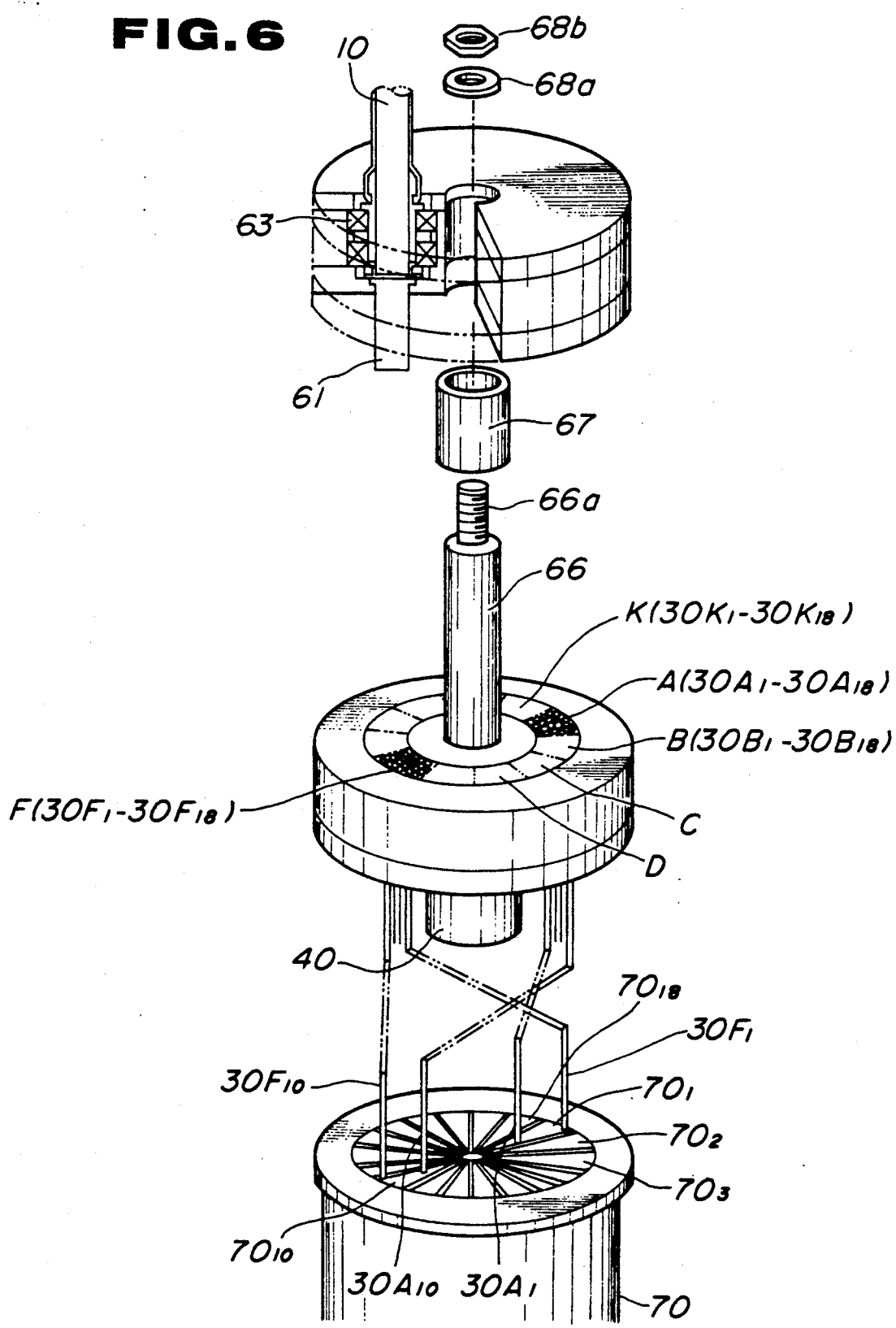

LIGHT DISTRIBUTION DEVICE

BACKGROUND OF THE INVENTION

The present invention relates to a light distribution device and more particularly to a device which is able to receive the light transmitted through a single light-guide cable and able to time-sharingly distribute the same to a large number of light-guide cables each in turn. More concretely, the present invention relates to a device which is capable of effectively supplying light necessary for the photosynthesis of objects such as algae (as for example, chlorella, spirulina etc.), photosynthetic bacteria and other artificially photosynthesized substances (as for instance, callus and the like) or plants, mushrooms etc.

A chlorella culturing device, as an example of a photosynthetic reactor, has been proposed, in which chlorella is cultured by using light and carbon dioxide to effect photosynthesis. However, as a result of detailed research into the photosynthetic process it has been found that one cycle of photosynthetic reaction in chlorella requires only brief light radiation (of about 10 micro-seconds) and in the remaining time (of about 200 micro-seconds) the photosynthetic reaction can be conducted without light radiation, more explicitly, the cycle of reaction can be more effectively performed with no light radiation for the remaining duration of the cycle. On the other hand, in case of chlorella culturing it is usual to use such a photosynthetic reactor (for instance, a chlorella culturing bath) wherein a large number of fluorescent lamps are arranged so as to allow the photosynthetic substances to pass through the gaps between the lamps. Said conventional bath, due to the use of a large number of fluorescent lamps, is large in size and consumes a large amount of electric energy. Furthermore it necessitates hard treatment of heat generated by the lamps. To solve these problems, the present applicant has previously proposed that solar rays or artificial rays be focused and introduced into a fiber optic cable and then transmitted therethrough to a light radiator which is used as a light source for a photosynthetic reactor. However, it is also evident that when a large scale photosynthetic reactor is constructed with the use of the above-mentioned light-radiating means, a large number of light radiators must be used or a large-sized device for focusing the sun's rays and/or artificial light rays is necessary.

To solve the above-mentioned problems, the present applicant has also proposed a light distribution device which is able to intermittently supply light energy to photosynthetic substances in order to more effectively promote the process of photosynthesis and therefore is sufficient to cover the need for light energy for any large-scale photosynthetic reactor at the fixed capacity of a solar ray and/or artificial light ray focusing device.

The present applicant has previously proposed a photosynthetic reactor's light source having a light-guiding rod or a light-guide cable for transmitting solar rays or artificial light rays focused by lenses and a transparent rotary rod. The light-emitting end of the light guide is disposed opposite to the rotating axis of the revolving rod, and a reflecting mirror is provided at the rotating axis of the revolving rod against the light-emitting end of the light guide. The light transmitted through the light guide and introduced into the revolving rod is reflected by said mirror and propagates toward the tip portion of the revolving rod, where the light is reflected again by a mirror provided thereat and then radiated out from the light-emitting surface of the revolving rod. A large number of light-guide cables are arranged to form a ring in opposition to the light-emitting surface of the revolving rod. Consequently, when the revolving rod is driven by a motor, the light-receiving faces of the light-guide cables, to be covered with the light-emitting surface of the revolving rod, are changed in turn and each light-guide cables receives instant light radiation for one cycle of rotation of the rotary rode. The end portion of each light-guide cables serves as a light radiator. The light radiators may be provided at a certain distance from each other in a photosynthetic reactor or widely spread apart in a plant cultivating room, a mushroom cultivating place etc.

As described above, in the case of the above-mentioned light distribution device, the light delivered thereto through the light guide can be supplied momentarily into the light guide cables each in turn through the revolving rod and, accordingly, the distributed light can be discharged momentarily from the output end of each light-guide cable at every rotation of the rotary rod into a photosynthetic reactor wherein a photosynthetic substance is radiated with light rays for a very short period, for instance, about 10 micro-seconds that initiates a cycle of photosynthetic reaction and completes the cycle without any additional light radiation and at the next time of light radiation after one rotation of the revolving rod, it initiates a new cycle of photosynthetic reaction. A series of photosynthetic reactions in the reactor is thus continued with the periodical light radiation of the photosynthetic substances. For initiating the process of photosynthesis in the object it is necessary to supply no less than a specified amount of light energy. In the above-mentioned light distribution device a necessary amount of light energy may be easily obtained by increasing the density of the light by a very small amount corresponding to the light-emitting surface of the revolving rod. Thanks to this construction feature, the device can work with a compact solar ray or artificial light ray collecting device for introducing light rays into the light guide. Furthermore, since the light discharged from the light-emitting surface of the revolving rod is time-sharingly distributed to many light-guide cables, the device can supply enough light energy into a photosynthetic reactor of a large capacity.

However, the above-mentioned light distribution device has such drawbacks that the revolving rod is difficult to make and is expensive. In view of these drawbacks, the present applicant has proposed a further improved device capable of distributing light rays transmitted through a single light-guide cable among a large number of light-guiding cables by applying simpler and less expensive means.

The improved light distribution device previously proposed by the present applicant includes a primary single light-guide cable for transmitting solar rays or artificial light rays introduced into its light-receiving end and a large number of secondary light-guide cables, the light-receiving ends of which are arranged together to form a ring of a light-receiving plane. An arm to be rotated by a motor has at its front end a light coupler integrally secured thereto and also an auxiliary arm integrally secured thereto for holding the light-emitting end of the primary light-guide cable by loosely fitting said cable's end in a bearing provided at said auxiliary arm. An arm supports the end portion of the light-guide cable by loosely inserting said cable's end through a spherical bearing provided in its front end, preferably being aligned with the axis of the driving motor. Accordingly, when the motor rotates, the arm is rotated to move the light coupler with the light-emitting end of the light-guide cable along the ring-plane formed by the light-emitting ends of a large number of light-guide cables and, thereby, to realize the sequential distribution of the light to the light-guide cables in the same way as the aforesaid device. In this improved device, the light-guide cable can be rotated as being supported in the spherical bearing that eliminates the possibility of damaging said cable due to excessive friction. While in this case the spherical bearing supports the rotating axis of the guide cable, it is also possible to support the cable only in a loose hole of the arm without using a spherical bearing. However, in such a case there may be fear of damaging the outer surface of the cable due to the possible rubbing of said surface against the inner surface of the through-hole. In the same manner, the light-emitting end of the light-guide cable can be loosely fitted into the through-hole of the auxiliary arm without using a supporting bearing. In both cases the light-emitting end of the light-guide cable can be rotated without being twisted along the ring-plane formed by the light-emitting faces of a large number of light-guide cables.

However, in the above-mentioned light distribution device no limitation is placed on the use of the light-guide cables and nothing is proposed concerning their effective use that may fail in the effective utilization of the device. In particular, since each of the secondary light-guide cables receives only momentary light radiation for one revolution of the light-emitting end of the primary light-guide cable around the light-receiving ring, it must wait for the next light supply for a long time. Effective use of the light energy may not be assured due to the extended period of darkness as opposed to the light radiation period. It was also impractical to shorten the dark reaction period by increasing the revolution speed of the device because of the difficulty in maintaining the mechanical durability of the device against the increased centrifugal force.

SUMMARY OF THE INVENTION

It is an object of the present invention to make the best utilization of light rays distributed to a large number of light-guiding cables.

It is another object of the present invention to provide a light distribution device capable of effectively introduceing light rays transmitted through a primary light-guide cable into a large number of secondary light guide cables and also to capable of effectively distributing the light rays introduced into the secondary light guide cables in such a way so as to efficiently promote the photosynthesis of the plants.

It is another object of the present invention to provide a light distribution device capable of more effectively transmitting the light rays for a long period since the light-receiving ends of the secondary light-guide cables are totally enclosed in order not to be contaminated by dust or dirt.

BRIEF DESCRIPTION OF THE DRAWINGS

FIG. 5 (b) is a view showing a case when the coupler is omitted in FIG. 5 (a);

FIG. 6 is an expanded construction view for explaining a light distribution device embodying the present invention;

DESCRIPTION OF THE PREFERRED EMBODIMENTS

Figure 1:
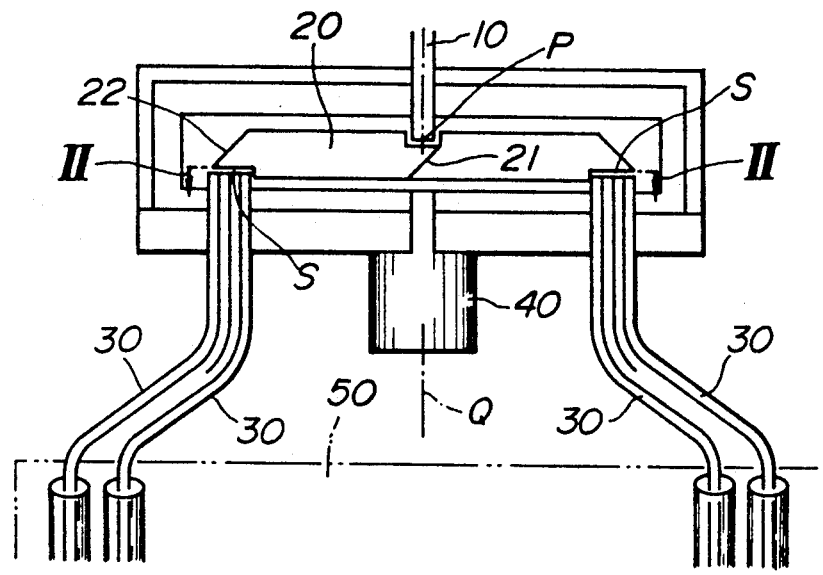
FIGS. 1 and 2 are views for explaining an example of a light distribution device previously proposed by the present applicant.
Figure 2:
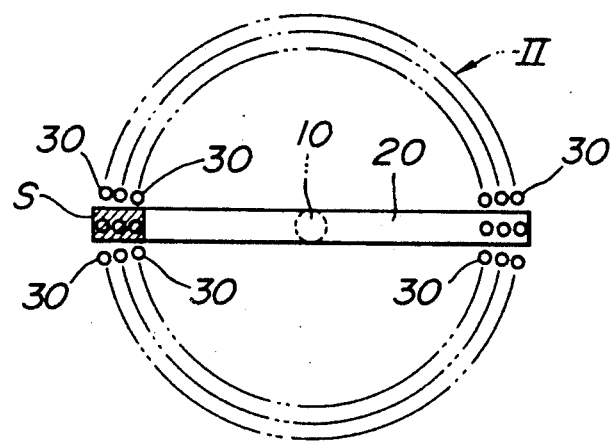

FIG. 1 is a main portion construction view for explaining a photosynthetic reactor's light source previously proposed by the present applicant. In FIG. 1, number 10 designates a light-guiding rod or a light-guide cable for transmitting solar rays or artificial light rays focused by lenses (not shown) and 20 is a transparent rotary rod. The light-emitting end P of the light guide 10 is disposed opposite to the rotating axis Q of the revolving rod 20, and a reflecting mirror 21 is provided at the rotating axis Q of the revolving rod 20 against the light-emitting end P of the light guide 10. The light transmitted through the light guide 10 and introduced into the revolving rod 20 is reflected by the mirror 21 and propagates toward the tip portion of the revolving rod 20, where the light is reflected again by a mirror 22 provided thereat and then radiated out from the light-emitting surface S of the revolving rod 20. A large number of light-guide cables 30 are arranged to form a ring II, as shown in FIG. 2, in opposition to the light-emitting surface S of the revolving rod. Consequently, when the revolving rod 20 is driven by a motor 40, the light-receiving faces of the light-guide cables 30, to be covered with the light-emitting surface S of the revolving rod 20, are changed in turn and each light-guide cables 30 receives instant light radiation for one cycle of rotation of the rotary rode 20. The end portion of each light-guide cables 30 serves as a light radiator. The light radiators may be provided at a certain distance from each other in a photosynthetic reactor or widely spread apart in a plant cultivating room, a mushroom cultivating place etc.

As described above, in the case of the above-mentioned light distribution device, the light delivered thereto through the light guide 10 can be supplied momentarily into the light guide cables 30 each in turn through the revolving rod 20 and, accordingly, the distributed light can be discharged momentarily from the output end of each light-guide cable 30 at every rotation of the rotary rod 20 into a photosynthetic reactor 50 wherein a photosynthetic substance is radiated with light rays for a very short period, for instance, about 10 micro-seconds that initiates a cycle of photosynthetic reaction and completes the cycle without any additional light radiation and at the next time of light radiation after one rotation of the revolving rod 20, it initiates a new cycle of photosynthetic reaction. A series of photosynthetic reactions in the reactor is thus continued with the periodical light radiation of the photosynthetic substances. For initiating the process of photosynthesis in the object it is necessary to supply no less than a specified amount of light energy. In the above-mentioned light distribution device a necessary amount of light energy may be easily obtained by increasing the density of the light by a very small amount corresponding to the light-emitting surface S of the revolving rod. Thanks to this construction feature, the device can work with a compact solar ray or artificial light ray collecting device (not shown) for introducing light rays into the light guide 10. Furthermore, since the light discharged from the light-emitting surface S of the revolving rod 20 is time-sharingly distributed to many light-guide cables 30, the device can supply enough light energy into a photosynthetic reactor of a large capacity.

However, the above-mentioned light distribution device has such drawbacks that the revolving rod 20 is difficult to make and is expensive. In view of these drawbacks, the present applicant has proposed a further improved device capable of distributing light rays transmitted through a single light-guide cable among a large number of light-guiding cables by applying simpler and less expensive means.

Figure 3:
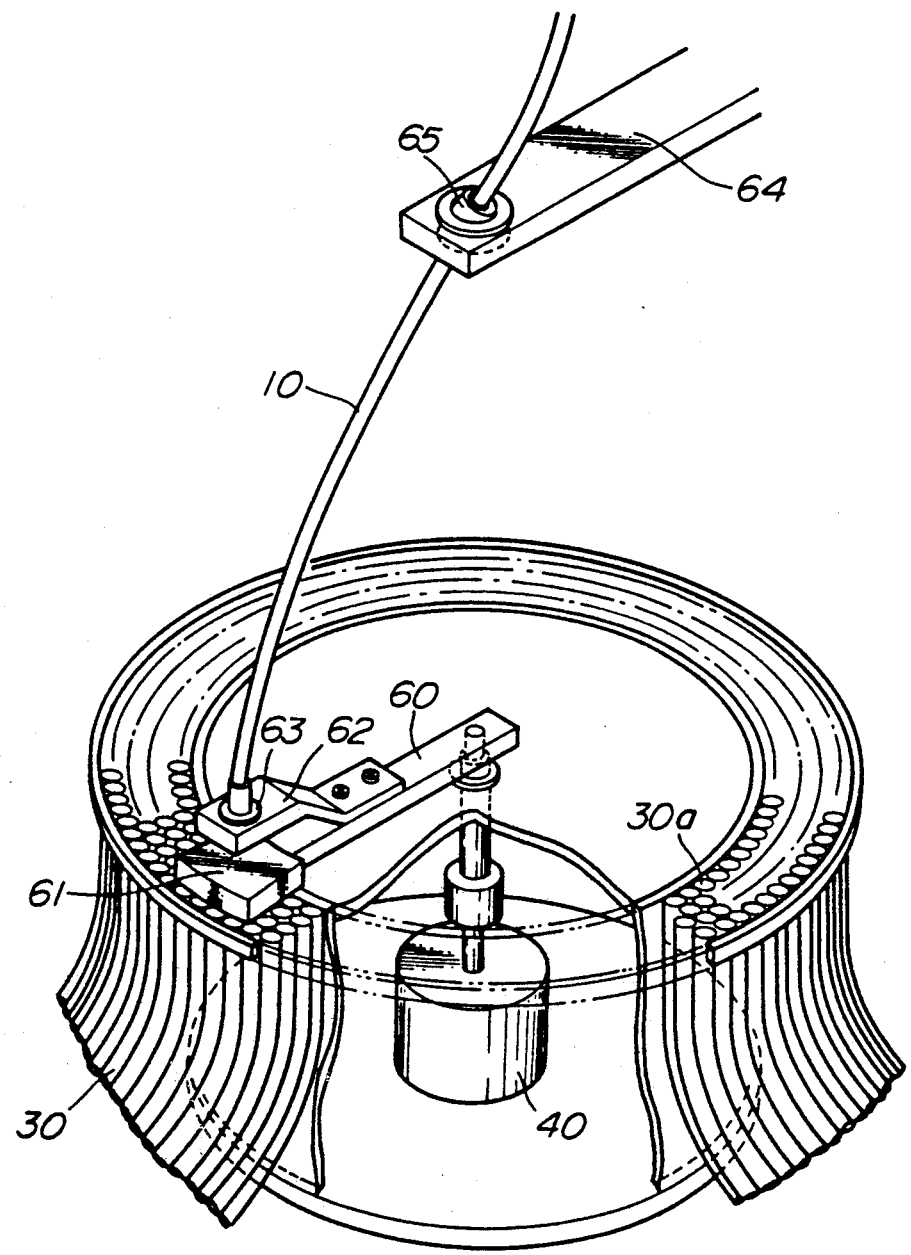
FIG. 3 is a construction view for explaining another example of a light distribution device previously proposed by the present applicant.

FIG. 3 is a construction view for explaining another example of the light distribution device previously proposed by the present applicant. In FIG. 3, numeral 10 designates a primary single light-guide cable (corresponding to the light-guide cable 10 shown in FIG. 1) for transmitting solar rays or artificial light rays introduced into its light-receiving end (not shown) and numeral 30 designates a large number of secondary light-guide cables (corresponding to the light-guide cables 30 shown in FIG. 1), the light-receiving ends 30a of which are arranged together to form a ring of a light-receiving plane. An arm 60 to be rotated by a motor 40 has at its front end a light coupler 61 integrally secured thereto and also an auxiliary arm 62 integrally secured thereto for holding the light-emitting end of the primary light-guide cable 10 by loosely fitting said cable's end in a bearing 63 provided at said auxiliary arm 62. An arm 64 supports the end portion of the light-guide cable 10 by loosely inserting said cable's end through a spherical bearing 65 provided in its front end, preferably being aligned with the axis of the driving motor 40. Accordingly, when the motor 40 rotates in the state shown in FIG. 3, the arm 60 is rotated to move the light coupler 61 with the light-emitting end of the light-guide cable 10 along the ring-plane formed by the light-emitting ends 30a of a large number of light-guide cables 30 and, thereby, to realize the sequential distribution of the light to the light-guide cables 30 in the same way as the aforesaid device. In this improved device, the light-guide cable 10 can be rotated as being supported in the spherical bearing 65 that eliminates the possibility of damaging said cable due to excessive friction. While in this case the spherical bearing 65 supports the rotating axis of the guide cable 10, it is also possible to support the cable only in a loose hole of the arm without using a spherical bearing. However, in such a case there may be fear of damaging the outer surface of the cable 10 due to the possible rubbing of said surface against the inner surface of the through-hole. In the same manner, the light-emitting end of the light-guide cable 10 can be loosely fitted into the through-hole of the auxiliary arm without using a supporting bearing 63. In both cases the light-emitting end of the light-guide cable 10 can be rotated without being twisted along the ring-plane formed by the light-emitting faces 30a of a large number of light-guide cables 30.

Figure 4:
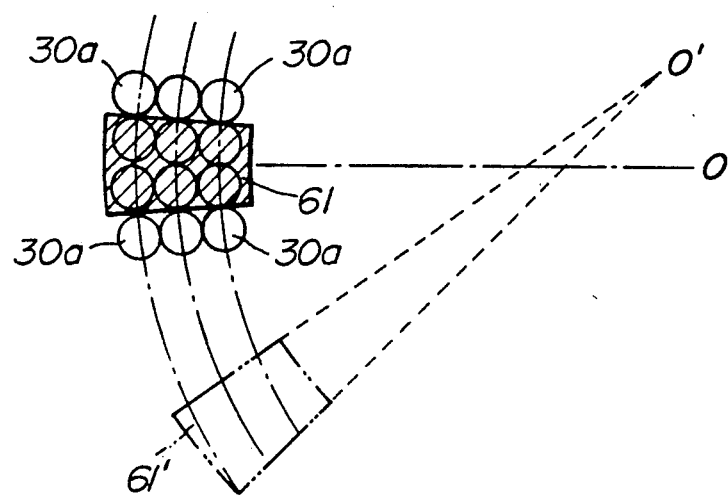
FIG. 4 is a plane view for explaining the relation between a light coupler and the light-receiving face of a light-guide cables.
Figure 5A:
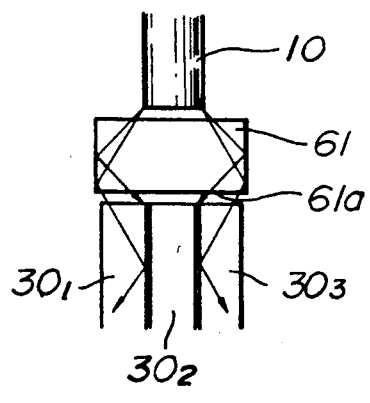
FIG. 5 (a) is a side view showing the relation between the light-emitting end of a primary light-guide cable, a light coupler and the light-receiving face of a secondary light-guide cables.
Figure 5B:
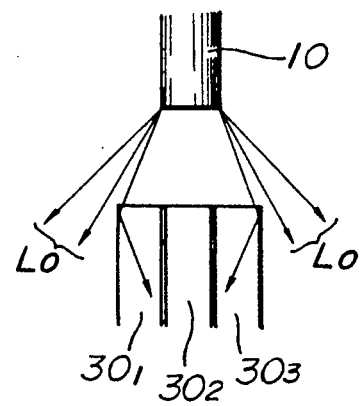

FIGS. 4 and 5 are views for explaining the relationship between the light-emitting end of the light-guide cable 10, the light coupler 61 and the light-guide cables 30. FIG. 4 is a plane view showing a relation between the light coupler 61 and the light-receiving face 30a of the light-guide cables 30, FIG. 5 (a) is a side view showing a relation between the light-emitting end of the light-guide cable 10, the light coupler 61 and the light-receiving face of the light-guide cables 30 and FIG. 5 (b) is a side view showing such a case when the coupler 61 is omitted in FIG. 5 (a). In the device shown in FIG. 5 (a), the light emitted from the light-guide cable 10 is introduced into the light coupler 61 wherein said light is reflected by the side walls and is guided into the light-guide cables 30. Furthermore, the relation between the light coupler 61 and the light-receiving face 30a of the guide cables 30 is kept constant. In other words, the rotation axis of the light coupler 61 and the axis of the ring formed by the light-receiving faces of the light-guide cables coincide with each other at a common center (O). Such a relation may not exist between the light coupler 61 relative to the ring-plane as shown by the broken line 61' in FIG. 4, i.e. no displacement of the axis of the light coupler 61 from the point (O) to the point (O') occurs. The light rays emitted from the light-guide cable 10 are introduced into the light coupler 61 and then reflected by the side walls to form a light beam of an almost uniform density which is discharged through the output end 61a of the light coupler 61. Consequently, each of the light-guide cables 30 can receive a substantially equal amount of light. This means that an equal amount of light can be obtained when any of the light-guide cables 30 is chosen. On the contrary, if the light coupler 61 is omitted, sidewardly scattered light rays Lo, as shown in FIG. 5 (b), cannot be guided into the light-guide cables 30 and a light beam emitted from the light-guide cable 10 may be different in strength at some of its portions i.e. the strength of said light beam may be reduced gradually from the center portion to the its periphery. Consequently, in the case shown in FIG. 5 (b), the amount of light introduced into each of the light-guide cables $30_1$ and $30_3$ is smaller than that of the light-guide cable $30_2$. Accordingly, the amount of light depends upon whichever is chosen among the light-guide cables 30. To prevent the light-guide cable 10 from being twisted, its light-emitting end may freely rotate in the bearing of the light coupler 61. So, if said coupler 61 is omitted, the light-guide cable 10 may be twisted and hence an amount of the light introduced into the light-guide cables 30 becomes unstable. Such a light distribution device may not be applied in the case when an optimum or given amount of light is needed.

However, in the above-mentioned light distribution device no limitation is placed on the use of the light-guide cables 30 and nothing is proposed concerning their effective use that may fail in the effective utilization of the device. In particular, since each of the secondary light-guide cables 30 receives only momentary light radiation for one revolution of the light-emitting end of the primary light-guide cable 10 around the light-receiving ring, it must wait for the next light supply for a long time. Effective use of the light energy may not be assured due to the extended period of darkness as opposed to the light radiation period. It was also impractical to shorten the dark reaction period by increasing the revolution speed of the device because of the difficulty in maintaining the mechanical durability of the device against the increased centrifugal force.

In view of the foregoing description, the present invention was made, in particular, to make the best utilization of light rays distributed to a large number of light-guide cables.

FIG. 6 is an expanded construction view for explaining a light distribution device embodying the present invention. In FIG. 6, a primary light-guide cable 10, a secondary light-guide cables 30 and a motor 40 are similar in their functions to the same elements in the light distribution device explained with reference to FIGS. 1 to 5. When the motor 40 is turned ON, a light coupler 61 together with the light-emitting end of the primary light-guide cable 10 moves along its circular track, distributing light rays to each of a large number of secondary light-guide cables disposed at their light-receiving ends under said circular track. In the case of the light distribution device, according to the present invention, the secondary light-guide cables 30 are divided into a specific number of blocks in accordance with the circumferential length of the light-emitting side of the light coupler 61 (11 blocks A–K for the embodiment shown in FIG. 6) and each block includes a specific number of secondary light-guide cables 30. In the device shown in FIG. 6, the secondary light-guide cables are allocated 18 pieces to every block (however, it is also possible to allocate a large number such as 18, i.e., 36 or 54 cables to every block or to allocate different quantities of the cables to separate blocks). In FIG. 6, 18 light guide cables $30A_1$–$30A_{18}$ are disposed in a block A, 18 light-guide cables $30B_1$–$30B_{18}$ in a block B and further 18 light guide cables $30K_1$–$30K_{18}$ in an 11th block K. A tank 70 for culturing chlorella and the like is divided into a certain number of inner sections (18 blocks $70_1$–$70_{18}$ in the shown case) corresponding to the number of cables allocated to each block of the light-receiving ring. Each section of the tank is supplied with light rays through the secondary light-guide cables distributed in the manner as described below. For instance, the tank section $70_1$ has light-guide cables led therein in a quantity of at least one cable for every block. More concretely, 11 light-guide cables $30A_1$, $30B_1$, $30C_1 \ldots 30K_1$ are led into the tank section $70_1$, 11 light-guide cables $30A_2$, $30B_2$, $30C_3 \ldots 30K_2$ are led into the tank section $70_2$ and further in the same manner 11 light-guide cables $30A_{18}$, $30B_{18}$, $30C_{18} \ldots 30K_{18}$ are led into the tank section $70K_{18}$. Consequently, while the light-coupler with the light-emitting end of the light-guide cable 10 revolves in the same way as mentioned above, the tank section $70_1$ is supplied with light rays through the light-guide cables $30A_1$, $30B_1 \ldots 30K_1$ in turn, the tank section $70_2$ is supplied with light rays through the light-guide cables $30A_2$, $30B_2 \ldots 30K_2$ each in turn and further, in a similar manner, the tank section $70_{18}$ is supplied with light rays through the light-guide cables $30A_{18}$, $30B_{18} \ldots 30K_{18}$ each in turn. Namely, the culture tank sections $70_1$–$70_{18}$ are lightened 11 times per one revolution of the light-coupler.

As is well known, photosynthesis involves a reaction to light and a reaction to dark. The first has a duration in micro-seconds and the latter has a duration in milli-seconds. In the above-mentioned arrangement of the secondary light-guide cables it becomes possible to supply every section of the culturing tank with 11 light radiations for one revolution of the light coupler in order to more effectively create a photosynthetic reaction therein.

Figure 7:
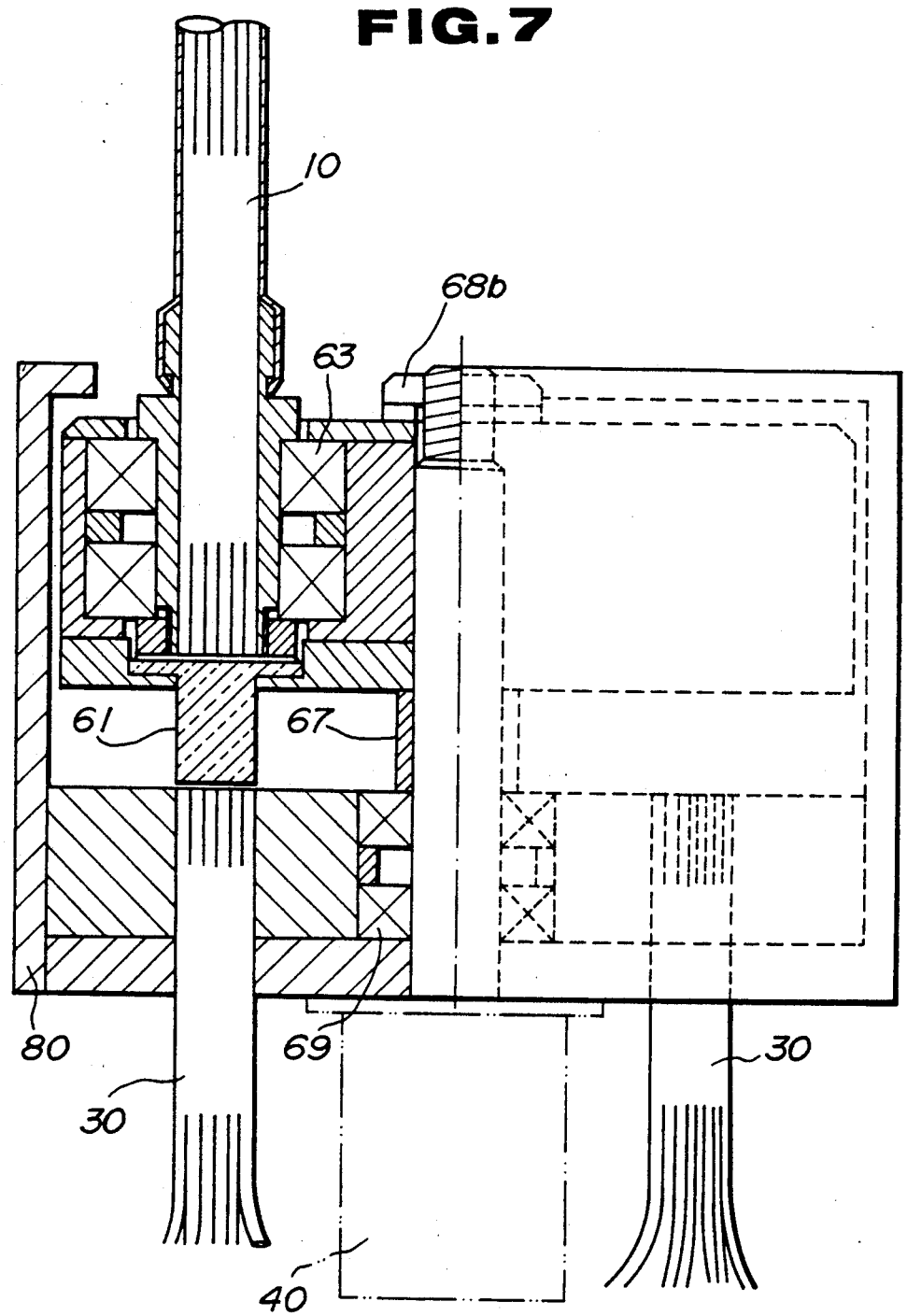
FIG. 7 is an assembled construction view showing a light coupler.

FIG. 7 shows the state of the device shown in FIG. 6 wherein the light 61 with the light-emitting end of the primary light-guide cable 10 and the light-receiving ends of the secondary light-guiding cables 30 are integrally assembled. In FIGS. 6 and 7, 63 is a bearing, 66 is a revolving shaft, 67 is a spacer, 68a is a washer, 68b is a nut and 69 is a bearing. The light-emitting end and the light-receiving end of the device can be unitarily coupled with each other by assembling the above-mentioned components in the following way: the spacer 67 is placed on the revolving shaft 66; a component including the light-coupler 61 is placed on the spacer 67 of the revolving shaft 66; the washer 68a is set on the upper threaded part of the revolving shaft and then the nut is screwed onto the upper threaded portion 66a of the revolving shaft 66. When the motor 40 is driven to rotate the revolving shaft, the light-emitting end face of the light-guide cable 10 (i.e., the light-emitting surface of the light coupler 61) goes over the ring plane formed by the light-receiving faces of the secondary light-guide cables 30, distributing the light delivered by the primary light-guide cable 10 among all the secondary light-guide cables 30.

Furthermore, the above-mentioned construction of the device eliminates the possibility of directly subjecting the light-receiving faces of the secondary light-guide cables 30 to the surrounding air. Namely, since the light-receiving faces of the secondary light guide cables 30 are protected from being contaminated by dust and dirt contained in the surrounding air, effective light transmission can be assured during a longer period of time. Furthermore, it is also possible to enclose the whole peripheral part of the device with the use of a cover 80 so as to completely protect the secondary light-guide cables 30 against dust and contaminants contained in the surrounding air.

Figure 8:
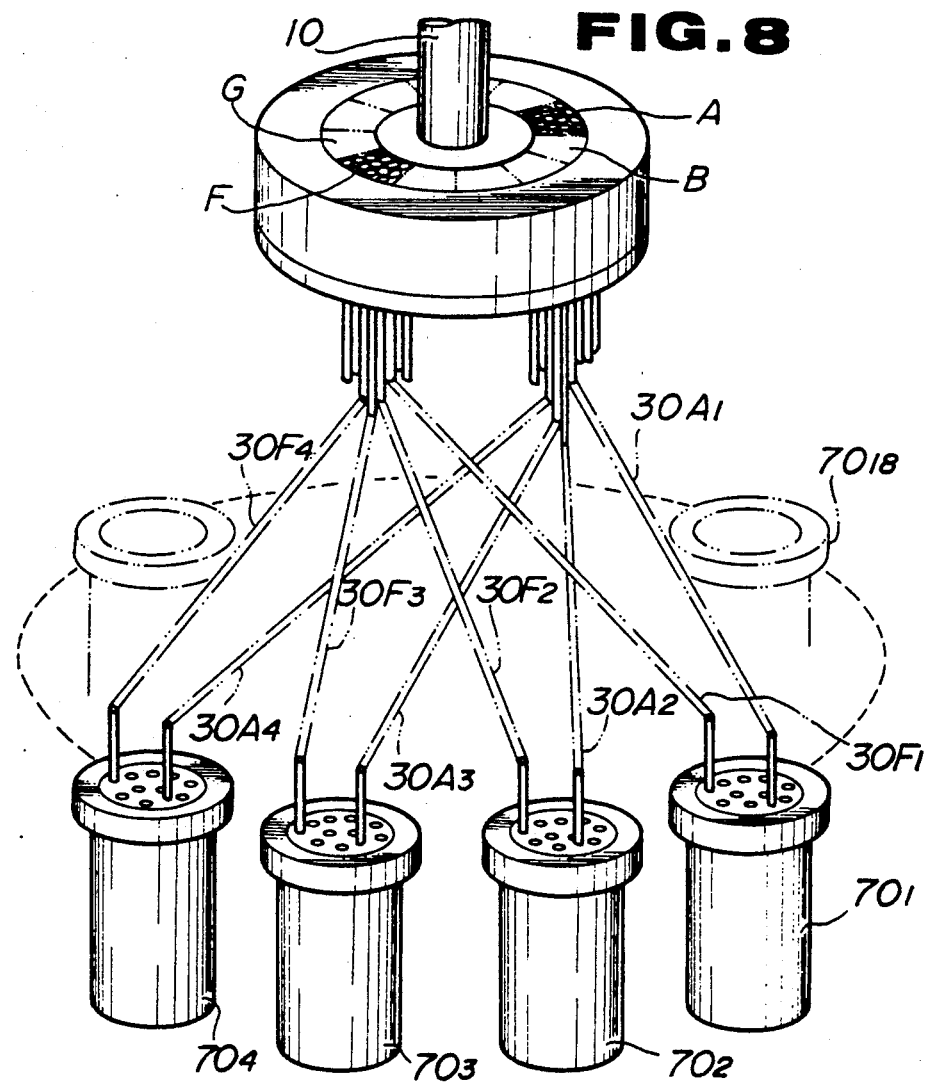
FIG. 8 is a view for explaining a modified embodiment of the present invention.

FIG. 8 is a view showing another embodiment of the present invention. In this case chlorella culturing tanks 71–718 are separately constructed as shown in FIG. 8 and each of them is supplied with light rays in the same way as the device shown in FIG. 6. While the described embodiments are used only for chlorella culturing, it may be easily understood that the present invention is not limited to said application and can be used as a light source for the phtosynthesis of any other objects such as leafy plants etc.

Figure 9A:
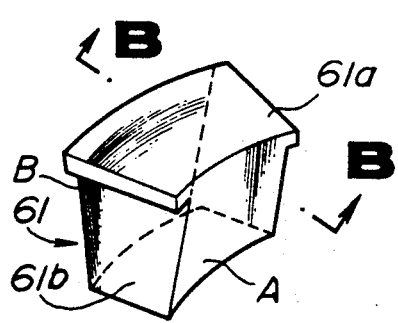
FIGS. 9a and 9b are a view for explaining an example of a light coupler.
Figure 9B:
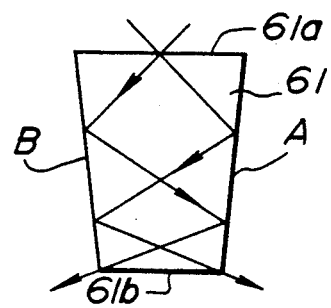

FIG. 9 is a view showing a detailed view of the light coupler 61 shown in FIG. 6: FIG. 9 (a) is a perspective view and FIG. 9 (b) is a sectional view taken along the plane of line B—B of FIG. 9 (a). The light coupler 61 is formed to have a large surface 61a facing the light-emitting end of the primary light-guide cable 10 and a small surface 61b facing the light-receiving end of the secondary light guide cables (that is, the length of the light coupler in its radial direction becomes shorter at the surface 61b). The light rays emitted from the primary light-guide cable 10 are introduced into the light coupler 61 wherein they propagate repeated reflections between the inner diameter of the side wall A and the outer diameter of the side wall B thereof and then are discharged at an enlarged angle therefrom into the secondary light-guide cables 30. The light emitted from the primary light-guide cable 10 is thus effectively introduced into the secondary light-guide cables 30 through the light coupler 61.

As is apparent from the foregoing description, according to the present invention, it may be possible to effectively introduce light rays transmitted through a primary light-guide cable into a large number of secondary light guide cables and also to effectively distribute the light rays introduced into the secondary light guide cables in such a way so as to efficiently promote the photosynthesis of the plants. While the technical idea and the fundamental principle of the present invention to distribute light rays transmitted through a single primary light-guide cable 10 to a large number of secondary light-guide cables 30 are the same as those involved in the light distribution device previously proposed by the present applicant, the light distribution device according to the present invention apparently differs from the previous one in its practical design and construction as shown in the corresponding drawings and is capable of more effectively transmitting the light rays for a long period since the light-receiving ends of the secondary light-guide cables 30 are totally enclosed in order not to be contaminated by dust or dirt.

I claim:

1. A light distribution apparatus comprising:
    a primary light-guide cable for transmitting light rays, said primary light-guide cable having an end portion having a light emitting end;
    a plurality of secondary light-guide cables each having an end portion having a light receiving end;
    support means for supporting said end portions of said secondary light-guide cables in a generally circular array about a central axis with each of said light receiving ends being disposed in a light receiving ring plane;
    revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables;
    said support means supporting said end portions of said secondary light-guide cables in a plurality of sectors with each sector including the end portions of a first sub-assembly of said secondary light-guide cables;
    light utilization means which utilize the light from said secondary light-guide cables, said light utilization means comprising a plurality of light utilization units with each of said units comprising a mounting means for mounting a second sub-assembly of said secondary light-guide cables, said light utilization means further comprising a vessel, each of said second sub-assemblies of said secondary light-guide cables being disposed in a part of said vessel;
    at least some of said secondary light-guide cables of said first sub-assembly being different from the second light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assembly are distributed to a plurality of different second sub-assemblies such that during one revolution of said primary light-guide cable, light rays are transmitted a plurality of times to the secondary light-guide cables of each of said second sub-assemblies.

2. A light distribution apparatus comprising:
    a primary light-guide cable for transmitting light rays, said primary light-guide cable having an end portion having a light emitting end;
    a plurality of secondary light-guide cables each having an end portion having a light receiving end;
    support means for supporting said end portions of said secondary light-guide cables in a generally circular array about a central axis with each of said light receiving ends being disposed in a light receiving ring plane;
    revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables;
    said support means supporting said end portions of said secondary light-guide cables in a plurality of sectors with each sector including the end portions of a first sub-assembly of said secondary light-guide cables;
    light utilization means which utilize the light from said secondary light-guide cables, said light utilization means comprising a plurality of light utilization units with each of said units comprising a mounting means for mounting a second sub-assembly of said secondary light-guide cables, said light utilization means further comprising a plurality of vessels, each of said second sub-assemblies being disposed in a different vessel of said plurality of vessels,
    at least some of said secondary light-guide cables of said first sub-assembly being different from the secondary light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assembly are distributed to a plurality of different second sub-assemblies such that during one revolution of said primary light-guide cable, light rays are transmitted a plurality of times to the secondary light-guide cables of each of said second sub-assemblies.

3. A light distribution apparatus comprising:
    a primary light-guide cable for transmitting light rays, said primary light-guide cable having an end portion having a light emitting end;
    a plurality of secondary light-guide cables each having an end portion having a light receiving end;
    support means for supporting said end portions of said secondary light-guide cables in a generally circular array about a central axis with each of said light receiving ends being disposed in a light receiving ring plane;

revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables;

said support means supporting said end portions of said secondary light-guide cables in a plurality of sectors with each sector including the end portions of a first sub-assembly of said secondary light-guide cables;

light utilization means which utilize the light from said secondary light-guide cables, said light utilization means comprising a plurality of light utilization units with each of said units comprising amounting means for mounting a second sub-assembly of said secondary light-guide cables, the number of said first sub-assemblies being equal to the number of said second sub-assemblies, said secondary light-guide cables being disposed and arranged such that said secondary light-guide cables in each individual first sub-assembly extends to each of said second sub-assemblies.

at least some of said secondary light-guide cables of said first sub-assembly being different from the secondary light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assembly are distributed to a plurality of different second sub-assemblies such that during one revolution of said primary light-guide cable, light rays are transmitted a plurality of times to the secondary light-guide cables of each of said second sub-assemblies.

4. A light distribution apparatus comprising:

a primary light-guide cable for transmitting light rays, said primary light-guide cable having an end portion having a light emitting end;

a plurality of secondary light-guide cables each having an end portion having a light receiving end;

support means for supporting said end portions of said secondary light-guide cables in a generally circuit array about a central axis with each of said light receiving ends being disposed in a light receiving plane;

revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables;

said support means supporting said end portions of said secondary light-guide cables in a plurality of sectors with each sector including the end portions of a first sub-assembly of said secondary light-guide cables;

light utilization means which utilize the light from said secondary light-guide cables, said light utilization means comprising a plurality of light utilization units with each of said units comprising a mounting means for mounting a second sub-assembly of said secondary light-guide cables, the number of said first sub-assemblies being equal to the number of said second sub-assemblies, said secondary light-guide cables being disposed and arranged such that said secondary light-guide cables in each individual first sub-assembly extends to each of said second sub-assemblies;

at least some of said secondary light-guide cables of said first sub-assembly being different from the secondary light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assembly are distributed to a plurality of different second sub-assemblies such that during one revolution of said primary light-guide cable, light rays are transmitted a plurality of times to the secondary light-guide cables of each of said second sub-assemblies.

5. A light distribution apparatus comprising:

a primary light-guide cable for transmitting light rays, said primary light-guide cable having an end portion having a light emitting end;

a plurality of secondary light-guide cables each having an end portion having a light receiving end;

support means for supporting said end portions of said secondary light-guide cables in a generally circuit array about a central axis with each of said light receiving ends being disposed in a light receiving ring plane;

revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables, said revolving means comprising an arm means which supports said end portion of said primary light-guide cable, said arm means further comprising coupler mounting means mounting said coupler means at said light emitting end of said primary light-guide cable;

said support means supporting said end portions of said secondary light-guide cables in a plurality of sectors with each sector including the end portions of a first sub-assembly of said secondary light-guide cables;

light utilization means which utilize the light from said secondary light-guide cables, said light utilization means comprising a plurality of light utilization units with each of said units comprising amounting means for mounting a second sub-assembly of said secondary light-guide cables;

at least some of said secondary light-guide cables of said first sub-assembly being different from the secondary light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assembly are distributed to a plurality of different second sub-assemblies such that during one revolution of said primary light-guide cable, light rays are transmitted a plurality of times to the secondary light-guide cables of each of said second sub-assemblies.

6. A light distributing apparatus according to claim 5, wherein said coupler means has a flange portion, said coupler mounting means engaging said flange portion to thereby mount said coupler means on said arm means.

7. A light distribution apparatus comprising:
a primary light-guide cable for transmitting light rays, said primary light-guide cable having an end portion having a light emitting end;
a plurality of secondary light-guide cables each having an end portion having a light receiving end;
support means for supporting said end portions of said secondary light-guide cables in a generally circular array about a central axis with each of said light receiving ends being disposed in a light receiving ring plane;
revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables, said coupler means having a cross-sectional configuration of a section of an annulus having opposite circular sides of different diameter and opposite radial planar sides;
said support means supporting said end portions of said secondary light-guide cables in a plurality of sectors with each sector including the end portions of a first sub-assembly of said secondary light-guide cables;
light utilization means which utilize the light from said secondary light-guide cables, said light utilization means comprising a plurality of light utilization units with each of said units comprising a mounting means for mounting a second sub-assembly of said secondary light-guide cables;
at least some of said secondary light-guide cables of said first sub-assembly being different form the secondary light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assemblies are distributed to a plurality of different second sub-assemblies such that during one revolution of said primary light-guide cable, light rays are transmitted a plurality of times to the secondary light-guide cables of each of said second sub-assemblies.

8. A light distribution apparatus comprising:
a primary light-guide cable for transmitting light rays, said primary light-guide cable having an end portion having a light emitting end;
a plurality of secondary light-guide cables, each having an end portion having a light receiving end;
support means for supporting said end portions of said secondary light-guide cables in a generally circular array about a central axis with each of said light receiving ends being disposed in a light receiving ring plane;
revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables, said coupler means having inner and outer circular wall portions which are tapered to converge with the smaller end of the taper being closer to said light receiving ring plane;
said support means supporting said end portions of said secondary light-guide cables in a plurality of sectors with each sector including the end portions of a first sub-assembly of said secondary light-guide cables;
light utilization means which utilize the light from said secondary light-guide cables, said light utilization means comprising a plurality of light utilization units with each of said units comprising a mounting means for mounting a second sub-assembly of said secondary light-guide cables;
at least some of said secondary light-guide cables of said first sub-assembly being different from the secondary light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assembly are distributed to a plurality of different second sub-assemblies such that during one revolution of said primary light-guide cable, light rays are transmitted a plurality of times to the secondary light-guide cables of each of said second sub-assemblies.

9. A light distribution apparatus comprising:
a primary light-guide cable for transmitting light rays, said primary light-guide cable having an end portion having a light emitting end;
a plurality of secondary light-guide cables each having an end portion having a light receiving end;
support means for supporting said end portions of said secondary light-guide cables in a generally circular array about a central axis with each of said light receiving ends being disposed in a light receiving ring plane;
revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables, said revolving means having an axis of rotation, said coupler means being generally tapered in an axial direction such that the smallest cross-sectional area is disposed juxtaposed to the light receiving end of said secondary light-guide cables;

said support means supporting said end portions of said secondary light-guide cables in a plurality of sectors with each sector including the end portions of a first sub-assembly of said secondary light-guide cables;

light utilization means which utilize the light from said secondary light-guide cables, said light utilization means comprising a plurality of light utilization units with each of said units comprising a mounting means for mounting a second sub-assembly of said secondary light-guide cables;

at least some of said secondary light-guide cables of said first sub-assembly being different from the secondary light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assembly are distributed to a plurality of different second sub-assemblies such that during one revolution of said primary light-guide cable, light rays are transmitted a plurality of times to the secondary light-guide cables of each of said second sub-assemblies.

10. A light distribution apparatus comprising:

a primary light-guide cable for transmitting light rays, said primary light-guide cable having an end portion having a light emitting end;

a plurality of secondary light-guide cables each having an end portion having a light receiving end;

support means for supporting said end portions of said secondary light-guide cables in a generally circular array about a central axis with each of said light receiving ends being disposed in a light receiving ring plane;

revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables, a cross-section of said coupler means having an outer circular wall spaced from an inner circular wall with the center of the circles which defines said outer and inner walls being coincident with said central axis;

said support means supporting said end portions of said secondary light-guide cables in a plurality of sectors with each sector including the end portions of a first sub-assembly of said secondary light-guide cables;

light utilization means which utilize the light from said secondary light-guide cables, said light utilization means comprising a plurality of light utilization units with each of said units comprising a mounting means for mounting a second sub-assembly of said secondary light-guide cables;

at least some of said secondary light-guide cables of said first sub-assembly being different form the secondary light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assembly are distributed to a plurality of different second sub-assemblies such that during one revolution of said primary light-guide cable, light rays are transmitted a plurality of times to the secondary light-guide cables of each of said second sub-assemblies.

11. A light distribution apparatus comprising:

a primary light-guide cable for transmitting light rays, said primary light-guide cable having an end portion having a light emitting end;

a plurality of secondary light-guide cables each having an end portion having a light receiving end;

support means for supporting said end portions of said secondary light-guide cables in a generally circular array about a central axis with each of said light receiving ends being disposed in a light receiving ring plane;

revolving means for revolving said end portion of said primary light-guide cable over said light receiving ring plane, said revolving means carrying a light coupler means disposed at said light emitting end of said primary light-guide cable such that when said light emitting end of said primary light-guide cable passes over said light receiving ring plane, the light rays are transmitted from said light emitting end through said coupler means to said light receiving ends of said secondary light-guide cables, said coupler means having an outer wall which has a partial conical configuration and an inner wall which has a partial conical configuration;

said support means supporting said end portions of said secondary light-guide cables in a plurality of sectors with each sector including the end portions of a first sub-assembly of said secondary light-guide cables;

light utilization means which utilize the light from said secondary light-guide cables, said light utilization means comprising a plurality of light utilization units with each of said units comprising a mounting means for mounting a second sub-assembly of said secondary light-guide cables;

at least some of said secondary light-guide cables of said first sub-assembly being different from the secondary light-guide cables of said second sub-assembly such that when said light emitting end of said primary light-guide cable revolves and passes over the light receiving ends of the secondary light-guide cables of said first sub-assembly, the light rays transmitted by the secondary light-guide cables of said first sub-assembly are distributed to a plurality of different second sub-assemblies such that during one revolution of said primary light-guide cable, light rays are transmitted a plurality of times to the secondary light-guide cables of each of said second sub-assemblies.

* * * * *